US012576365B2

(12) United States Patent
Katagiri et al.

(10) Patent No.: US 12,576,365 B2
(45) Date of Patent: Mar. 17, 2026

(54) SPIRAL MEMBRANE ELEMENT AND MEMBRANE SEPARATION SYSTEM

(71) Applicant: NITTO DENKO CORPORATION, Ibaraki (JP)

(72) Inventors: Makoto Katagiri, Ibaraki (JP); Yoshihiro Nakamura, Ibaraki (JP); Shinya Nishiyama, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 315 days.

(21) Appl. No.: 18/281,116

(22) PCT Filed: Feb. 28, 2022

(86) PCT No.: PCT/JP2022/008373
§ 371 (c)(1),
(2) Date: Sep. 8, 2023

(87) PCT Pub. No.: WO2022/190938
PCT Pub. Date: Sep. 15, 2022

(65) Prior Publication Data
US 2024/0149221 A1 May 9, 2024

(30) Foreign Application Priority Data
Mar. 9, 2021 (JP) ................................. 2021-037655

(51) Int. Cl.
B01D 63/10 (2006.01)
B01D 53/22 (2006.01)
(Continued)

(52) U.S. Cl.
CPC ......... B01D 63/103 (2013.01); B01D 53/228 (2013.01); B01D 61/362 (2013.01);
(Continued)

(58) Field of Classification Search
CPC .. B01D 63/103; B01D 53/228; B01D 61/362; B01D 63/1031; B01D 63/107;
(Continued)

(56) References Cited

U.S. PATENT DOCUMENTS

| | | |
|---|---|---|
| 4,476,022 A | 10/1984 | Doll |
| 2004/0195164 A1 | 10/2004 | Hirokawa et al. |
| 2013/0087499 A1 | 4/2013 | Uda et al. |
| 2016/0279575 A1 | 9/2016 | Kobuke et al. |

FOREIGN PATENT DOCUMENTS

| | | |
|---|---|---|
| CA | 2124200 A1 | 6/1993 |
| JP | 2010-82575 A | 4/2010 |

(Continued)

OTHER PUBLICATIONS

The Extended European Search Report dated Feb. 7, 2025 for corresponding European Patent Application No. 22766897.7 (7 pages).
(Continued)

*Primary Examiner* — Ekandra S. Miller-Cruz
(74) *Attorney, Agent, or Firm* — Hauptman Ham, LLP

(57) ABSTRACT

The present invention provides a spiral membrane element suitable for suppressing a decrease in a permeation rate (or a permeation flux) of a permeated fluid from a separation membrane. A spiral membrane element of the present invention includes: a central tube; a membrane leaf that has a separation membrane and a permeation spacer and is wound around the central tube; and a flow passage spacer that is connected to the permeation spacer and is wound around the central tube on a side closer to the central tube than the membrane leaf is. A pressure loss of the flow passage spacer measured by a predetermined test is smaller than a pressure loss of the permeation spacer.

14 Claims, 5 Drawing Sheets

(51) Int. Cl.

| | | |
|---|---|---|
| *B01D 61/36* | (2006.01) | |
| *B01D 69/02* | (2006.01) | |
| *B01D 69/12* | (2006.01) | |
| *B01D 71/52* | (2006.01) | |
| *B01D 71/56* | (2006.01) | |
| *B01D 71/70* | (2006.01) | |
| *B01D 71/80* | (2006.01) | |

(52) U.S. Cl.
  CPC ....... *B01D 63/1031* (2022.08); *B01D 63/107* (2022.08); *B01D 69/02* (2013.01); *B01D 69/1216* (2022.08); *B01D 71/52* (2013.01); *B01D 71/56* (2013.01); *B01D 71/70* (2013.01); *B01D 71/80* (2013.01); *B01D 2313/146* (2013.01); *B01D 2315/10* (2013.01); *B01D 2325/20* (2013.01)

(58) Field of Classification Search
  CPC .... B01D 69/02; B01D 69/1216; B01D 71/52; B01D 71/56; B01D 71/70; B01D 71/80; B01D 2313/146; B01D 2315/10; B01D 2325/20; B01D 2257/504; Y02C 20/40
  USPC .................................................... 210/321.85
  See application file for complete search history.

(56) References Cited

FOREIGN PATENT DOCUMENTS

| JP | 4650921 B2 | 3/2011 | |
| JP | 2012-20282 A | 2/2012 | |
| JP | 2015-85233 A | 5/2015 | |
| WO | WO-1993010889 A1 * | 11/1991 | ............. B01D 61/28 |

OTHER PUBLICATIONS

International Search Report issued on Apr. 26, 2022, for corresponding International Patent Application No. PCT/JP2022/008373, along with an English translation (5 pages).
Written Opinion issued on Apr. 26, 2022, for corresponding International Patent Application No. PCT/JP2022/008373, along with an English translation (6 pages).
Eiji Kamio et al., "Inorganic/Organic Double-Network Gels Containing Ionic Liquids", Advanced Materials, 2017, vol. 29, cited in the Specification (8 pages).
Notice of Reasons for Refusal issued on Jan. 6, 2026 for corresponding Japanese Patent Application No. 2023-505308, along with an English machine translation (6 pages).

* cited by examiner 12 (12A)

12 (12B)

SPIRAL MEMBRANE ELEMENT AND MEMBRANE SEPARATION SYSTEM

CROSS REFERENCE TO RELATED APPLICATION

This application is a National Stage of International Application No. PCT/JP2022/008373, filed on Feb. 28, 2022, which designates the United States and was published in Japan, and which is based upon and claims priority to Japanese Patent Application No. 2021-037655, filed on Mar. 9, 2021 in the Japan Patent Office. All of the aforementioned applications are hereby incorporated by reference in their entireties.

TECHNICAL FIELD

The present invention relates to a spiral membrane element and a membrane separation system.

BACKGROUND ART

A membrane separation method has been developed as a method for separating an acid gas such as carbon dioxide from a gas mixture containing the acid gas. The membrane separation method allows an efficient separation of an acid gas with a suppressed operation cost, compared with an absorption method according to which an acid gas contained in a gas mixture is absorbed by an absorbent to be separated.

A spiral membrane element is used for the membrane separation method, for example. The spiral membrane element includes a central tube and a membrane leaf that is wound around the central tube. The membrane leaf has a separation membrane and a permeation spacer. The spiral membrane element is suitable for allowing the separation membrane to have an increased membrane area in the membrane element.

The spiral membrane element further has, for example, a flow passage spacer that is wound around the central tube on a side closer to the central tube than the membrane leaf is (Patent Literature 1, for example). The flow passage spacer makes it possible to deliver a permeated fluid from the membrane leaf to the central tube easily. The presence of the flow passage spacer in producing the spiral membrane element makes it possible to wind the membrane leaf around the central tube easily.

CITATION LIST

Patent Literature

Patent Literature 1: JP 4650921 B

SUMMARY OF INVENTION

Technical Problem

A permeation rate of the permeated fluid from the separation membrane tends to be lower in the spiral membrane element than a permeation rate of the permeated fluid from the separation membrane that is the same but in the state of a flat membrane. That is, the use of the separation membrane in the spiral membrane element tends to decrease the permeation rate of the permeated fluid from the separation membrane. This tendency is particularly remarkable in a method (a decompression method) according to which an inside of the central tube is decompressed to operate the spiral membrane element.

Therefore, the present invention is intended to provide a spiral membrane element suitable for suppressing a decrease in a permeation rate (or a permeation flux) of a permeated fluid from a separation membrane.

Solution to Problem

As a result of intensive studies, the present inventors newly found that a decrease in a permeation rate of a permeated fluid in a spiral membrane element is due to a pressure loss of a spacer, particularly of a flow passage spacer. The present inventors made further studies on the basis of this finding and have completed the present invention.

The present invention provides a spiral membrane element including:

a central tube;

a membrane leaf that has a separation membrane and a permeation spacer and is wound around the central tube; and a flow passage spacer that is connected to the permeation spacer and is wound around the central tube on a side closer to the central tube than the membrane leaf is, wherein a pressure loss $P1$ of the flow passage spacer measured by a test below is smaller than a pressure loss $P2$ of the permeation spacer measured by the test below.

Test: A specimen is prepared by laminating, on a polyethylene terephthalate film, a spacer (the flow passage spacer or the permeation spacer) that is rectangular and is 150 mm in length and 47 mm in width. A nitrogen gas is delivered to a space adjacent to the film of the specimen in such a manner that a pressure in the space is 0.1 MPa while a nitrogen gas is delivered to the spacer at a flow rate of 2.5 L/min. A pressure loss caused by that the nitrogen gas moves in the spacer in a longitudinal direction of the spacer is measured.

The present invention further provides a membrane separation system including:

the above-mentioned spiral membrane element; and a decompression device that decompresses an inside of the central tube.

The present invention further provides a spiral membrane element including:

a central tube;

a membrane leaf that has a separation membrane and a permeation spacer and is wound around the central tube; and a flow passage spacer that is connected to the permeation spacer and is wound around the central tube on a side closer to the central tube than the membrane leaf is, wherein a pressure loss $P1$ of the flow passage spacer measured by a test below is 30 kPa or less.

Test: A specimen is prepared by laminating, on a polyethylene terephthalate film, the flow passage spacer that is rectangular and is 150 mm in length and 47 mm in width. A nitrogen gas is delivered to a space adjacent to the film of the specimen in such a manner that a pressure in the space is 0.1 MPa while a nitrogen gas is delivered to the flow passage spacer at a flow rate of 2.5 L/min. A pressure loss caused by that the nitrogen gas moves in the flow passage spacer in a longitudinal direction of the flow passage spacer is measured.

Advantageous Effects of Invention

The present invention can provide a spiral membrane element suitable for suppressing a decrease in a permeation rate (or a permeation flux) of a permeated fluid from a separation membrane.

DESCRIPTION OF EMBODIMENTS

The present invention will be described in detail below. The following description is not intended to limit the present invention to a specific embodiment.

<Embodiment of Spiral Membrane Element>

Figure 1:
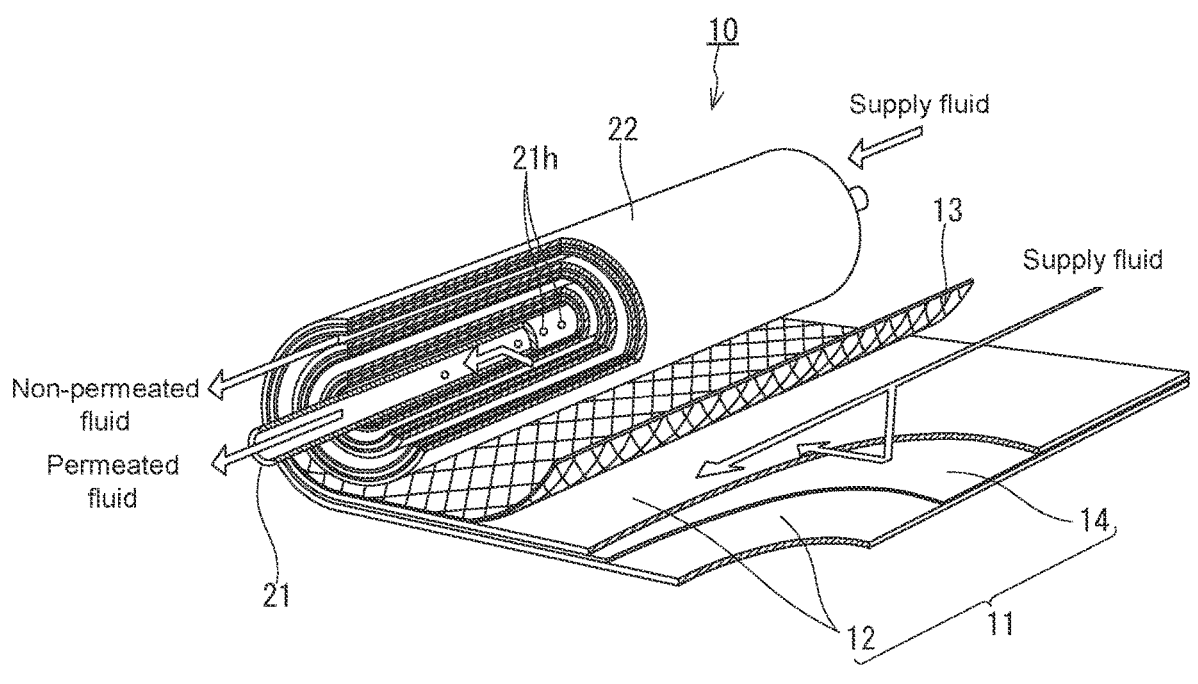
FIG. 1 is a developed perspective view illustrating schematically a spiral membrane element according to one embodiment of the present invention.
Figure 2:
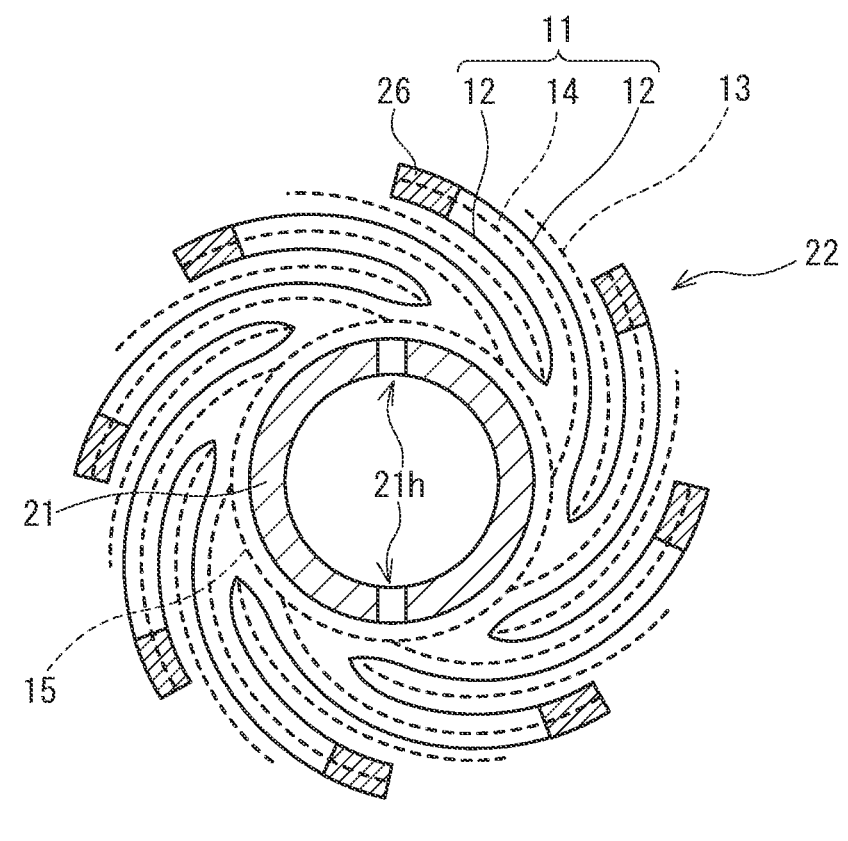
FIG. 2 is a schematic cross-sectional view of the spiral membrane element.

FIGS. 1 and 2 illustrate a spiral membrane element 10 (hereinafter referred to as a "separation membrane element 10") according to one embodiment of the present invention. The separation membrane element 10 includes a central tube 21 and a laminate 22. The laminate 22 is wound around the central tube 21 and disposed around the central tube 21. In an inside of the laminate 22, a supply fluid flow passage and a permeated fluid flow passage are formed.

A supply fluid is supplied from one end face of the laminate 22 to an inside of the separation membrane element 10 and flows, in parallel with a longitudinal direction of the central tube 21, through the supply fluid flow passage. In the separation membrane element 10, the supply fluid is divided to generate a permeated fluid and a non-permeated fluid. The permeated fluid is guided to an outside via the central tube 21. The non-permeated fluid is discharged to an outside of the separation membrane element 10 from another end face of the laminate 22.

The supply fluid to be processed by the separation membrane element 10 may be a gas or a liquid. In one example, the supply fluid is a gas mixture containing an acid gas, particularly a gas mixture containing carbon dioxide and nitrogen. In another example, the supply fluid is a liquid mixture containing a volatile organic compound, particularly a liquid mixture containing an alcohol (such as isopropanol) and water.

The separation membrane element 10 further includes a flow passage spacer 15. The flow passage spacer 15 is positioned between the central tube 21 and the laminate 22 and is wound around the central tube 21 on a side closer to the central tube 21 than the laminate 22 is. The flow passage spacer 15 secures, between the laminate 22 and the central tube 21, a space serving as the permeated fluid flow passage.

The separation membrane element 10 may further include a shell that surrounds the laminate 22. The shell may be made of FRP (fiber reinforced plastic). In order to protect the end faces of the laminate 22 and prevent the laminate 22 from extending telescopically, an end face member may be disposed on each of both sides of the laminate 22.

As shown in FIGS. 1 and 2, the laminate 22 has a plurality of membrane leaves 11. Each of the membrane leaves 11 has a separation membrane 12 and a permeation spacer 14. Specifically, the membrane leaf 11 has two pieces of the separation membranes 12. The two pieces of the separation membranes 12 are stacked with each other and sealed on three sides in such a manner as to have a bag-like structure. For the sealing of the two pieces of the separation membranes 12, an adhesive layer 26 including an adhesive is used, for example. The permeation spacer 14 is disposed between the two pieces of the separation membranes 12 in such a manner as to be positioned inside the bag-like structure. An opening end of the membrane leaf 11 is connected to the flow passage spacer 15, and thereby the permeation spacer 14 is connected to the flow passage spacer 15. The permeation spacer 14 secures, between the two pieces of the separation membrane 12, a space serving as the permeated fluid flow passage. The number of the membrane leaves 11 in the laminate 22 is, for example, but not particularly limited to, 2 to 30.

The laminate 22 further has a supply spacer 13. The supply spacer 13 is positioned outside the above-mentioned bag-like structure and is laminated on the membrane leaf 11. Specifically, the laminate 22 has a plurality of the supply spacers 13, and the plurality of the supply spacers 13 and the plurality of the membrane leaves 11 are laminated alternately in the laminate 22. The supply spacer 13 secures, between the membrane leaf 11 and the membrane leaf 11, a space serving as the supply fluid flow passage.

The central tube 21 serves the role of collecting the permeated fluid having permeated through each of the separation membranes 12 and guiding it to the outside of the separation membrane element 10. The central tube 21 is provided with an opening $21h$ that allows an inner space of the central tube 21 to communicate with an outer space of the central tube 21. The opening $21h$ is, for example, a through hole formed in a wall surface of the central tube 21. Specifically, the central tube 21 is provided with a plurality of the openings $21h$ at predetermined intervals along a direction in which the central tube 21 extends. The number of rows of the openings $21h$ provided along the direction in which the central tube 21 extends is, for example, but not particularly limited to, 1 and 2. The central tube 21 may be provided with two rows of the openings $21h$ in such a manner that the rows face each other. The flow passage spacer 15 is in contact with each of the openings $21h$. Thereby, the permeated fluid can flow from the flow passage spacer 15 to an inside of the central tube 21 through the openings $21h$. An outer diameter of the central tube 21 is, for example, 10 to 100 mm, and preferably 12 to 50 mm.

In the present embodiment, a pressure loss P1 (kPa) of the flow passage spacer 15 is smaller than a pressure loss P2 (kPa) of the permeation spacer 14. The pressure loss P1 can be measured by the following method using a measuring device 30 shown in FIG. 3. First, a spacer $15a$ that is rectangular and is 150 mm in length and 47 mm in width is prepared. The spacer $15a$ has the same geometry, except the length and the width, as that of the flow passage spacer 15 that is before being wound around the central tube 21. A longitudinal direction of the spacer 15a coincides with a direction in which the flow passage spacer 15 is wound around the central tube 21. Next, a polyethylene terephthalate film 41 is laminated on the spacer 15a to produce a specimen 40. The film 41 is PET100SG2 available from PANAC Co., Ltd., for example.

Next, the specimen 40 is placed in the measuring device 30. The measuring device 30 includes a holder 31, a lid member 35, and a sealing member 34, for example. The specimen 40 is placed in the holder 31 of the measuring device 30 in such a manner that the spacer 15a of the specimen 40 is positioned to be lower than the film 41. Openings 32 and 33 are formed in a wall surface of the holder 31. Each of the openings 32 and 33 communicates with the spacer 15a of the specimen 40. The openings 32 and 33 are positioned in such a manner that when a nitrogen gas is introduced from the opening 32, which is one of the openings, to an inside of the holder 31, the nitrogen gas moves in a longitudinal direction X of the spacer 15a and is discharged from the opening 33, which is the other opening. The openings 32 and 33 may or may not face each other.

Figure 3:
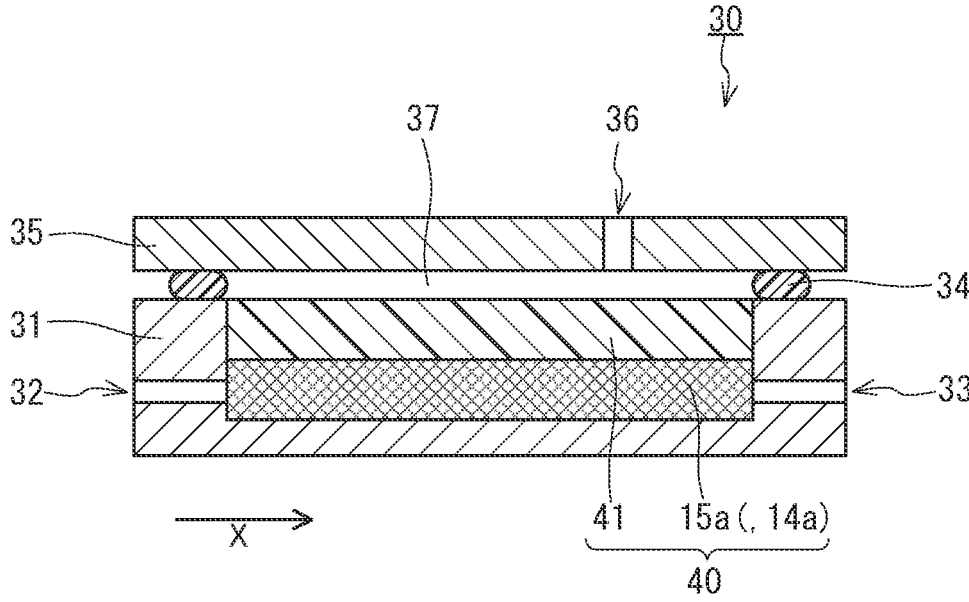
FIG. 3 is a schematic cross-sectional view illustrating one example of a measuring device for measuring a pressure loss of a spacer.

The lid member 35 is fastened to the holder 31 at an upper part of the holder 31 using a fastener (not shown). In the lid member 35, an opening 36 for delivering a nitrogen gas to a space 37 adjacent to the film 41 of the specimen 40 is formed. The sealing member 34 is positioned between the holder 31 and the lid member 35 and prevents gas flow between an inside and an outside of the measuring device 30 at a portion except the openings 32, 33, and 36. The sealing member 34 is, for example, a sealing ring (an O-ring) that is composed of an elastic material and has a circular cross section. FIG. 3 illustrates a state in which the sealing member 34 that is a sealing ring is squeezed.

Next, a nitrogen gas is delivered to the space 37 adjacent to the film 41 of the specimen 40 through the opening 36 of the lid member 35 in such a manner that the pressure in the space 37 is 0.1 MPa while a nitrogen gas is delivered to spacer 15a through the opening 32 of the holder 31 at a flow rate of 2.5 L/min. The nitrogen gas to be delivered into the measuring device 30 has a temperature of 23° C., for example. The nitrogen gas delivered through the opening 32 moves in the spacer 15a in the longitudinal direction X of the spacer 15a and is discharged from the opening 33. A difference (a pressure difference D1) between the pressure of the nitrogen gas delivered to the opening 32 and the pressure of the nitrogen gas discharged from the opening 33 is measured. Next, a pressure difference D0 is measured by the same method as the method for measuring the pressure difference D1, except that the spacer 15a is absent. Based on the pressure differences D0 and D1, a pressure loss caused by the spacer 15a is calculated. The calculated value can be considered as the pressure loss P1 caused by that the nitrogen gas moves in the spacer 15a in the longitudinal direction X of the spacer 15a.

The pressure loss P2 can be measured by the same method as the method used for the pressure loss P1, except that a spacer 14a corresponding to the permeation spacer 14 is used instead of the spacer 15a. The spacer 14a has the same geometry, except its length and width, as that of the flow passage spacer 14 that is before being wound around the central tube 21.

A relationship between the pressure losses P1 and P2 measured by the above-mentioned test method coincides well with a relationship between a pressure loss of the flow passage spacer 15 and a pressure loss of the permeation spacer 14 at the time when the separation membrane element 10 is being operated.

The separation membrane element 10 usually has a plurality of the permeation spacers 14. In the present embodiment, the pressure loss P1 of the flow passage spacer 15 is smaller than the pressure loss P2 of at least one selected from the permeation spacers 14. As long as this requirement is satisfied, the separation membrane element 10 may include the permeation spacer 14 that exhibits the pressure loss P2 having the same value as that of the pressure loss P1 or having a value smaller than that of the pressure loss P1. In one example, the pressure loss P1 of the flow passage spacer 15 may have the same value as that of the pressure loss P2 of one of the permeation spacers 14 while being smaller than the pressure loss P2 of each of all the other permeation spacers 14. The pressure loss P1 of the flow passage spacer 15 is preferably smaller than the pressure loss P2 of each of all the permeation spacers 14.

A value (P2−P1) obtained by subtracting the pressure loss P1 from the pressure loss P2 is, for example, but not particularly limited to, 5 kPa or more, preferably 10 kPa or more, and more preferably 20 kPa or more. The upper limit of the value (P2−P1) is, for example, but not particularly limited to, 50 kPa. A ratio (P1/P2) of the pressure loss P1 with respect to the pressure loss P2 is, for example, but not particularly limited to, 0.8 or less, preferably 0.5 or less, and more preferably 0.2 or less. The lower limit of the ratio (P1/P2) is, for example, but not particularly limited to, 0.01.

The pressure loss P1 is, for example, 30 kPa or less, preferably 20 kPa or less, more preferably 10 kPa or less, and still more preferably 6 kPa or less. The lower limit of the pressure loss P1 is, for example, but not particularly limited to, 0.1 kPa. The pressure loss P1 may be more than 30 kPa depending on the case.

The present invention provides, in another aspect, the spiral membrane element 10 including:

the central tube 21;

the membrane leaf 11 that has the separation membrane 12 and the permeation spacer 14 and is wound around the central tube 21; and the flow passage spacer 15 that is connected to the permeation spacer 14 and is wound around the central tube 21 on a side closer to the central tube 21 than the membrane leaf 11 is, wherein the pressure loss P1 of the flow passage spacer 15 measured by the above-mentioned test is 30 kPa or less.

The pressure loss P2 is more than 30 kPa and 50 kPa or less, for example. The pressure loss P2 may be 30 kPa or less depending on the case.

Examples of the flow passage spacer 15 include a net, a mesh, a wire woven fabric, a fiber woven fabric, a nonwoven fabric, a recessed sheet, and a corrugated sheet. Examples of a material of the flow passage spacer 15 include: a resin material such as polypropylene (PP), polyethylene (PE), polyethylene terephthalate (PET), polyamide, polyphenylene sulfide (PPS), an ethylene-chlorotrifluoroethylene copolymer (ECTFE), an epoxy resin, or a urethane resin; a natural polymer; a rubber; and a metal.

A thickness of the flow passage spacer 15 is, for example, but not particularly limited to, 300 μm or more, preferably 400 μm or more, more preferably 500 μm or more, and still more preferably 600 μm or more. The larger the thickness of the flow passage spacer 15 is, the more the pressure loss P1 of the flow passage spacer 15 tends to decrease. The upper limit of the thickness of the flow passage spacer 15 is, for example, but not particularly limited to, 2000 μm from the viewpoint of sufficiently securing a membrane area of the separation membrane 12 in the separation membrane element 10.

An opening ratio of the flow passage spacer 15 is, for example, but not particularly limited to, 30% or more, preferably 40% or more, and more preferably 50% or more. The higher the opening ratio of the flow passage spacer 15 is, the more the pressure loss P1 of the flow passage spacer 15 tends to decrease. The upper limit of the opening ratio of the flow passage spacer 15 is, for example, but not particularly limited to, 80%.

The opening ratio of the flow passage spacer 15 can be determined by the following method. First, the flow passage spacer 15 is placed on a film and a surface of the flow passage spacer 15 is observed with a scanning electron microscope (SEM). From the obtained electron microscope image, an area A1 of the surface of the flow passage spacer 15 and an area A2 (an area of a gap formed in the flow passage spacer 15) in which the film can be seen through the flow passage spacer 15 are calculated by image processing. The ratio of the area A2 with respect to the area A1 can be determined as the opening ratio of the flow passage spacer 15.

Table 1 below shows specific examples of the flow passage spacer 15. The flow passage spacer 15 is preferably PE30.

TABLE 1

| Product number | Material | Opening ratio (%) | Thickness (µm) | Pressure loss P1 (kPa) |
|---|---|---|---|---|
| T-90 | PET | 70 | 450 | 12.3 |
| T-140 | PET | 64 | 340 | 15.8 |
| PE30 | PE | 50 | 650 | 5.6 |
| PE14 | PE | 54 | 1350 | 1.0 |
| 13mil | PP | 51 | 320 | 24.1 |
| 34mil | PP | 69 | 760 | 0.7 |

Examples of the permeation spacer 14 include a net, a mesh, a wire woven fabric, a fiber woven fabric, a nonwoven fabric, a recessed sheet, and a corrugated sheet. As a material of the permeation spacer 14, the materials mentioned above for the flow passage spacer 15 can be mentioned.

A thickness of the permeation spacer 14 is, for example, but not particularly limited to, less than 300 µm, and preferably 250 µm or less. The smaller the thickness of the permeation spacer 14 is, the more easily a sufficient number of the membrane leaves 11 can be disposed inside the separation membrane element 10. In other words, a sufficient membrane area of the separation membrane 12 in the separation membrane element 10 can be secured easily. The lower limit of the thickness of the permeation spacer 14 is, for example, but not particularly limited to, 100 µm. The thickness of the permeation spacer 14 may be 300 µm or more depending on the case.

An opening ratio of the permeation spacer 14 is, for example, but not particularly limited to, less than 30%, preferably 25% or less, and more preferably 20% or less. The lower the opening ratio of the permeation spacer 14 is, the more a performance deterioration of the separation membrane 12 caused by that a portion of the separation membrane 12 enters a gap in the permeation spacer 14 at the time when the separation membrane element 10 is being operated tends to be suppressed. The lower limit of the opening ratio of the permeation spacer 14 is, for example, but not particularly limited to, 10%. The opening ratio of the permeation spacer 14 may be 30% or more depending on the case. The opening ratio of the permeation spacer 14 can be determined by the method mentioned above for the flow passage spacer 15.

As a specific example of the permeation spacer 14, #1000E (material: PET, opening ratio: 22%, thickness: 250 µm, pressure loss P2: 33.6 kPa) can be mentioned. The permeation spacer 14 may be the examples shown in Table 1 depending on the case.

In the present embodiment, the permeation spacer 14 is basically different from the flow passage spacer 15. However, in the separation membrane element 10, at least one selected from the permeation spacers 14 may be identical to the flow passage spacer 15. In one example, one of the permeation spacers 14 may be identical to the flow passage spacer 15 and all the other permeation spacers 14 may be different from the flow passage spacer 15. Specifically, one of the permeation spacers 14 may be PE30 and all the other permeation spacers 14 may be #1000E.

The supply spacer 13 is not particularly limited and the examples mentioned above for the permeation spacer 14 or the flow passage spacer 15 can be used suitably, for example.

[Separation Membrane]

The separation membrane 12 may be a separation membrane (a gas separation membrane) capable of allowing an acid gas contained in a gas mixture to preferentially permeate therethrough, or may be a separation membrane (a liquid separation membrane) capable of allowing a volatile organic compound contained in a liquid mixture to preferentially permeate therethrough. Hereinafter, the separation membrane 12 as a gas separation membrane will be described.

Figure 4A:
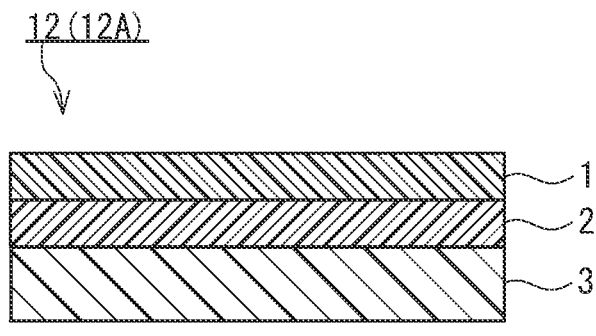
FIG. 4A is a schematic cross-sectional view illustrating one example of a separation membrane included in the spiral membrane element.

As shown in FIG. 4A, a separation membrane 12A as a gas separation membrane includes, for example, a separation functional layer 1 and a porous support member 3 supporting the separation functional layer 1, and may further include an intermediate layer 2 disposed between the separation functional layer 1 and the porous support member 3. The intermediate layer 2 is in direct contact with each of the separation functional layer 1 and the porous support member 3, for example.

(Separation Functional Layer)

The separation functional layer 1 is, for example, a layer capable of allowing an acid gas contained in a gas mixture to preferentially permeate therethrough. In a preferred embodiment, the separation functional layer 1 includes a resin. Examples of the resin included in the separation functional layer 1 include a polyether block amide resin, a polyamide resin, a polyether resin, a polyimide resin, a cellulose acetate resin, a silicone resin, and a fluorine resin. The separation functional layer 1 preferably includes a polyether block amide resin. In this embodiment, the separation functional layer 1 is preferably composed substantially of a resin. In the present description, the phrase "composed substantially of" means exclusion of other component that alters essential characteristics of a material referred to, and for example means that 95 wt % or more or even 99 wt % or more is composed of the material.

In another preferred embodiment, the separation functional layer 1 includes an ionic liquid. The separation functional layer 1 includes, for example, a double-network gel including an ionic liquid. The double-network gel is a gel including two types of network structures independent from each other. The double-network gel includes, for example, a first network structure composed mainly of an organic material, a second network structure composed mainly of an inorganic material, and an ionic liquid. In the present specification, the phrase "composed mainly of" means that 50 wt % or more or even 70 wt % or more is composed of the material.

The organic material for constituting the first network structure includes, for example, a polymer such as polyacrylamide (particularly, polydialkylacrylamide such as polydimethylacrylamide). The polymer included in the organic material may have a structural unit derived from an acrylamide derivative and may further include a cross-linked structure. The polymer including a cross-linked structure can be produced by a known method. First, a prepolymer having a structural unit having an N-hydroxysuccinimide ester group is prepared, for example. The structural unit having an N-hydroxysuccinimide ester group derives from N-acryloxysuccinimide, for example. Next, the prepolymer is allowed to react with an amine cross linking agent to obtain a polymer including a cross-linked structure. The amine cross linking agent is a compound, such as ethylene glycol bis(3-aminopropyl) ether, having two or more primary amino groups.

The second network structure may include a network of a plurality of particles. The network of the plurality of particles are formed by, for example, the plurality of particles being bonded to each other by hydrogen bonds. The particles included in the second network structure may be particles exemplified as the nanoparticles described later. In one example, the particles included in the second network structure are silica particles.

In the present embodiment, specific examples of the ionic liquid include an ionic liquid having: imidazolium, pyridinium, ammonium, or phosphonium; and a substituent having 1 or more carbon atoms.

In an ionic liquid having imidazolium and a substituent having 1 or more carbon atoms, examples of the substituent having 1 or more carbon atoms include an alkyl group having 1 to 20 carbon atoms, a cycloalkyl group having 3 to 14 carbon atoms, and an aryl group having 6 to 20 carbon atoms, and these may be each further substituted by a hydroxy group, a cyano group, an amino group, a monovalent ether group, or the like (for example, a hydroxyalkyl group having 1 to 20 carbon atoms).

Examples of the alkyl group having 1 to 20 carbon atoms include a methyl group, an ethyl group, an n-propyl group, an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, an n-eicosadecyl group, an i-propyl group, a sec-butyl group, an i-butyl group, a 1-methylbutyl group, a 1-ethylpropyl group, a 2-methylbutyl group, an i-pentyl group, a neopentyl group, a 1,2-dimethylpropyl group, a 1,1-dimethylpropyl group, a t-pentyl group, a 2-ethylhexyl group, and a 1,5-dimethylhexyl group. These may be each further substituted by a hydroxy group, a cyano group, an amino group, a monovalent ether group, or the like.

The above alkyl group may be substituted by a cycloalkyl group. The number of carbon atoms in the alkyl group substituted by the cycloalkyl group is, for example, 1 or more and 20 or less. Examples of the alkyl group substituted by the cycloalkyl group include a cyclopropyl methyl group, a cyclobutyl methyl group, a cyclohexyl methyl group, and a cyclohexyl propyl group. These may be each further substituted by a hydroxy group, a cyano group, an amino group, a monovalent ether group, or the like.

Examples of the cycloalkyl group having 3 to 14 carbon atoms include a cyclopropyl group, a cyclobutyl group, a cyclopentyl group, a cyclohexyl group, a cycloheptyl group, a cyclooctyl group, a cyclododecyl group, a norbornyl group, a bornyl group, and an adamantyl group. These may be each further substituted by a hydroxy group, a cyano group, an amino group, a monovalent ether group, or the like.

Examples of the aryl group having 6 to 20 carbon atoms include a phenyl group, a toluyl group, a xylyl group, a mesityl group, an anisyl group, a naphthyl group, and a benzyl group. These may be each further substituted by a hydroxy group, a cyano group, an amino group, a monovalent ether group, or the like.

A compound having imidazolium and a substituent having 1 or more carbon atoms may further have a substituent such as an alkyl group, and may form a salt with a counter anion. Examples of the counter anion include alkyl sulfate, tosylate, methanesulfonate, acetate, bis(fluorosulfonyl)imide, bis(trifluoromethanesulfonyl)imide, thiocyanate, dicyanamide, tricyanomethanide, tetracyanoborate, hexafluorophosphate, tetrafluoroborate, and halide. From the viewpoint of gas separation performance, preferred are bis(fluorosulfonyl)imide, bis(trifluoromethanesulfonyl)imide, dicyanamide, tricyanomethanide, and tetracyanoborate.

Specific examples of the ionic liquid having imidazolium and a substituent having 1 or more carbon atoms include 1-ethyl-3-methylimidazolium bis(fluorosulfonyl)imide, 1-ethyl-3-methylimidazolium dicyanamide, 1-butyl-3-methylimidazolium bromide, 1-butyl-3-methylimidazolium chloride, 1-butyl-3-methylimidazolium tetrafluoroborate, 1-butyl-3-methylimidazolium hexafluorophosphate, 1-butyl-3-methylimidazolium trifluoromethanesulfonate, 1-butyl-3-methylimidazolium tetrachloroferrate, 1-butyl-3-methylimidazolium iodide, 1-butyl-2,3-dimethylimidazolium chloride, 1-butyl-2,3-dimethylimidazolium hexafluorophosphate, 1-butyl-2,3-dimethylimidazolium tetrafluoroborate, 1-butyl-3-methylimidazolium bis(trifluoromethanesulfonyl)imide, 1-butyl-2,3-dimethylimidazolium bis(trifluoromethanesulfonyl)imide, 1-butyl-2,3-dimethylimidazolium bis(trifluoromethanesulfonyl)imide, 1-butyl-3-methylimidazolium trifluoro(trifluoromethyl)borate, 1-butyl-3-methylimidazolium tribromide, 1,3-dimesitylimidazolium chloride, 1,3-bis(2,6-diisopropylphenyl)imidazolium chloride, 1,3-diisopropylimidazolium tetrafluoroborate, 1,3-di-tert-butylimidazolium tetrafluoroborate, 1,3-dicyclohexylimidazolium tetrafluoroborate, 1,3-dicyclohexylimidazolium chloride, 1,2-dimethyl-3-propylimidazolium iodide, 1-hexyl-3-methylimidazolium chloride, 1-hexyl-3-methylimidazolium hexafluorophosphate, 1-hexyl-3-methylimidazolium tetrafluoroborate, 1-hexyl-3-methylimidazolium bromide, 1-methyl-3-propylimidazolium iodide, 1-methyl-3-n-octylimidazolium bromide, 1-methyl-3-n-octylimidazolium chloride, 1-methyl-3-n-octylimidazolium hexafluorophosphate, 1-methyl-3-[6-(methylsulfinyl)hexyl]imidazolium p-toluenesulfonate, 1-ethyl-3-methylimidazolium tricyanomethanide, and 1-(2-hydroxyethyl)-3-methylimidazolium bis(trifluoromethanesulfonyl)imide.

Among these, from the viewpoint of gas separation performance, particularly preferred are 1-ethyl-3-methylimidazolium bis(fluorosulfonyl)imide ([EMI][FSI]), 1-ethyl-3-methylimidazolium dicyanamide ([EMI][DCA]), 1-ethyl-3-methylimidazolium tricyanomethanide ([EMI][TCM]), 1-butyl-3-methylimidazolium bis(trifluoromethanesulfonyl) imide ([$C_4$mim][$TF_2N$]), and 1-(2-hydroxyethyl)-3-methylimidazolium bis(trifluoromethanesulfonyl)imide ([$C_2$OHim][$TF_2N$]).

The method for producing the double-network gel is not particularly limited, and for example, the method disclosed in E. Kamio et al., Adv. Mater., 29, 1704118 (2017) can be used.

A content of the ionic liquid in the double-network gel is, for example, 50 wt % or more, preferably 60 wt % or more, more preferably 70 wt % or more, and still more preferably 80 wt % or more. The higher the content of the ionic liquid is, the more preferentially the separation functional layer 1 can allow the acid gas contained in the gas mixture to permeate therethrough. The upper limit of the content of the ionic liquid is, for example, but not particularly limited to, 95 wt %.

A content of the first network structure composed mainly of an organic material in the double-network gel is, for example, 1 wt % or more, preferably 5 wt % or more, and more preferably 10 wt % or more. The upper limit of the content of the first network structure is 15 wt %, for example. A content of the second network structure composed mainly of an inorganic material in the double-network gel is, for example, 1 wt % or more from the viewpoint of improving the strength of the double-network gel. The upper limit of the content of the second network structure is 5 wt %, for example. The ratio of the total value of the weight of the first network structure and the weight of the second network structure with respect to the weight of the double-network gel is, for example, 2 wt % or more, preferably 5 wt % or more, and more preferably 10 wt % or more. This ratio is preferably 20 wt % or less. In this embodiment, the separation functional layer 1 is preferably composed substantially of the double-network gel.

A thickness of the separation functional layer 1 is, for example, 50 μm or less, preferably 25 μm or less, and more preferably 15 μm or less. In some cases, the thickness of the separation functional layer 1 may be 10 μm or less, 5.0 μm or less, or 2.0 μm or less. The thickness of the separation functional layer 1 may be 0.05 μm or more, or 0.1 μm or more.

(Intermediate Layer)

The intermediate layer 2 includes a resin, for example, and may further include nano particles dispersed in the resin (a matrix). In the matrix, the nanoparticles may be spaced from each other or may aggregate partially. A material of the matrix is not particularly limited, and examples thereof include a silicone resin such as polydimethylsiloxane; a fluorine resin such as polytetrafluoroethylene; an epoxy resin such as polyethylene oxide; a polyimide resin; a polysulfone resin; a polyacetylene resin such as polytrimethylsilylpropyne or polydiphenylacetylene; a polyolefin resin such as polymethylpentene; and a polyurethane resin. The matrix preferably includes at least one selected from the group consisting of a silicone resin and a polyurethane resin, and more preferably includes both a silicone resin and a polyurethane resin.

The nanoparticle may include an inorganic material. The nanoparticle may include an organic material. Examples of the inorganic material included in the nanoparticle include silica, titania, and alumina. The nanoparticle preferably includes silica.

A thickness of the intermediate layer 2 is, for example, but not particularly limited to, less than 50 μm, preferably 40 μm or less, and more preferably 30 μm or less. The lower limit of the thickness of the intermediate layer 2 is, for example, but not particularly limited to, 1 μm. The intermediate layer 2 is, for example, a layer having a thickness of less than 50 μm.

(Porous Support Member)

The porous support member 3 supports the separation functional layer 1 via the intermediate layer 2. Examples of the porous support member 3 include: a nonwoven fabric; porous polytetrafluoroethylene; aromatic polyamide fiber; a porous metal; a sintered metal; porous ceramic; porous polyester; porous nylon; activated carbon fiber; latex; silicone; silicone rubber; a permeable (porous) polymer including at least one selected from the group consisting of polyvinyl fluoride, polyvinylidene fluoride, polyurethane, polypropylene, polyethylene, polystyrene, polycarbonate, polysulfone, polyether ether ketone, polyacrylonitrile, polyimide, and polyphenylene oxide; a metallic foam having an open cell or a closed cell; a polymer foam having an open cell or a closed cell; silica; a porous glass; and a mesh screen. The porous support member 3 may be a combination of two or more of these materials.

The porous support member 3 has an average pore diameter of 0.01 to 0.4 μm, for example. A thickness of the porous support member 3 is, for example, but not particularly limited to, 10 μm or more, preferably 20 μm or more, and more preferably 50 m or more. The thickness of the porous support member 3 is, for example, 300 μm or less, preferably 200 μm or less, and more preferably 150 μm or less.

[Method for Producing Separation Membrane]

The separation membrane 12A can be produced by the following method, for example. First, a coating liquid containing the materials of the intermediate layer 2 is prepared. Next, the coating liquid containing the materials of the intermediate layer 2 is applied onto the porous support member 3 to form a coating film. The method for applying the coating liquid is not particularly limited, and a spin coating method, a dip coating method, and a gravure coating method can be used, for example. The coating liquid may be applied, for example, using a wire bar. By adjusting concentrations, etc. of the materials of the intermediate layer 2 in the coating liquid, it is possible to adjust the thickness of the intermediate layer 2 to be formed. Next, the coating film is dried to form the intermediate layer 2. The coating film can be dried under heating conditions, for example. The heating temperature of the coating film is, for example, 50° C. or higher. The heating time of the coating film is, for example, one minute or longer, and may be five minutes or longer.

A surface of the intermediate layer 2 can be subjected to an adhesion improvement treatment, if necessary. As the adhesion improvement treatment, a surface treatment such as application of a primer, a corona discharge treatment, or a plasma treatment may be provided.

Next, a coating liquid containing the materials of the separation functional layer 1 is prepared. The coating liquid containing the materials of the separation functional layer 1 is applied onto the intermediate layer 2 to obtain a coating film. The coating film is dried to form the separation functional layer 1. The method for applying the coating liquid and the drying conditions can be the same as the method and the conditions described above for the intermediate layer 2. Thus, the separation membrane 12A is obtained.

The method for producing the separation membrane 12A is not limited to the above method. For example, the separation membrane 12A can be produced by the following method. For example, the coating liquid containing the materials of the separation functional layer 1 is applied onto a transfer film to obtain a coating film. The coating film is dried to form the separation functional layer 1. Next, the coating liquid containing the materials of the intermediate layer 2 is applied onto the separation functional layer 1 and dried to form the intermediate layer 2. The laminate of the intermediate layer 2 and the separation functional layer 1 is transferred to the porous support member 3. Thus, the separation membrane 12A is obtained.

[Modification of Separation Membrane]

As described above, the separation membrane 12 may be a separation membrane (a liquid separation membrane) capable of allowing a volatile organic compound contained in a liquid mixture to preferentially permeate therethrough. The separation membrane 12 as a liquid separation membrane is, for example, a pervaporation membrane that allows a gaseous permeated fluid containing the above-mentioned organic compound to be generated by a pervaporation method. The separation membrane 12 as a liquid separation membrane will be described hereinafter.

Figure 4B:
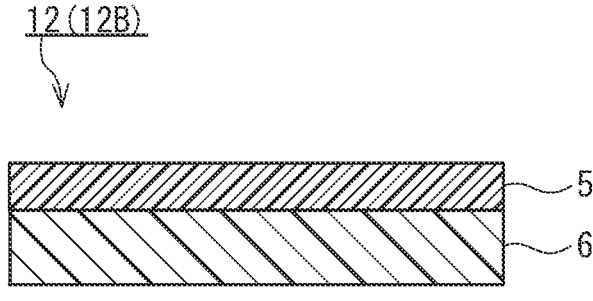
FIG. 4B is a schematic cross-sectional view illustrating a modification of the separation membrane included in the spiral membrane element.

As shown in FIG. 4B, a separation membrane 12B as a liquid separation membrane includes, for example, a separation functional layer 5 and a porous support member 6 supporting the separation functional layer 5. The separation membrane 12B may further include a protective layer (not shown) that protects the separation functional layer 5. The separation functional layer 5 is in direct contact with the porous support member 6, for example.

(Separation Functional Layer)

The separation functional layer 5 is, for example, a layer capable of allowing a volatile organic compound contained in a liquid mixture to preferentially permeate therethrough. The separation functional layer 5 includes, for example, a hydrophobic material such as: a silicone resin such as polydimethylsiloxane (PDMS); or a polyolefin resin such as polypropylene. The separation functional layer 5 preferably includes a silicone resin as the hydrophobic material. The separation functional layer 5 may include the hydrophobic material as a main component, or may be composed substantially of the hydrophobic material only. The term "main component" means a component having a largest content in the separation functional layer 5 in terms of weight ratio.

The separation functional layer 5 may include a matrix including the hydrophobic material and a filler dispersed in the matrix. The filler is buried in the matrix. In the matrix, all particles of the filler may be spaced from each other or may aggregate partially.

The filler includes, for example, an inorganic material such as a zeolite. The zeolite included in the filler is preferably a high-silica zeolite having a high ratio of silica to alumina. Having high resistance to hydrolysis, the high-silica zeolite is suitably used for separating a liquid that contains water. As the high-silica zeolite, HSZ (registered trademark) available from Tosoh Corporation, HiSiv (registered trademark) available from UNION SHOWA K.K., USKY available from UNION SHOWA K.K., and Zeoal (registered trademark) available from Nakamura Choukou Co., Ltd. can be used.

The filler is in the form of particles, for example. The term "form of particles" herein includes spherical, elliptical, flaky, and fibrous forms. The average particle diameter of the filler is, for example, but not particularly limited to, 50 μm or less, preferably 20 μm or less, and more preferably 10 μm or less. The lower limit of the average particle diameter of the filler is 0.01 μm, for example. The average particle diameter of the filler can be determined by the following method, for example. First, a cross-section of the separation functional layer 5 is observed using a transmission electron microscope. The area of a specific particle of the filler on the resulting electron microscope image is calculated by image processing. The diameter of a circle having the same area as the calculated area is regarded as the particle diameter (the diameter of the particle) of the specific filler particle. The particle diameter was calculated for any number (at least 50)

of the filler particles, and the average of the calculated values was regarded as the average particle diameter of the filler.

A content of the filler in the separation functional layer 5 is, for example, 10 wt % or more, and preferably 20 wt % or more. The upper limit of the content of the filler in the separation functional layer 5 is, for example, but not particularly limited to, 70 wt %. A content of the matrix in the separation functional layer 5 is, for example, but not particularly limited to, 30 wt % to 90 wt %.

A thickness of the separation functional layer 5 is, for example, 200 μm or less, preferably 100 μm or less, and more preferably 80 μm or less. The thickness of the separation functional layer 5 may be 1.0 μm or more, 10 μm or more, or 30 μm or more.

The separation functional layer 5 may have a microporous structure with an average pore diameter of less than 0.01 μm, but may be a dense layer having no pore on its surface.

(Porous Support Member)

As the porous support member 6, the porous support member mentioned above for the separation membrane 12A can be used.

(Protective Layer)

The protective layer covers a surface of the separation functional layer 5, for example. The material of the protective layer is, for example, but not particularly limited to, a silicone resin. A material of the protective layer may be the same as that of the matrix of the separation functional layer 5. A thickness of the protective layer is, for example, but not particularly limited to, 5 μm or more, preferably 10 μm or more, and more preferably 20 μm or more. The thickness of the protective layer is, for example, 100 μm or less, and preferably 50 μm or less.

[Method for Producing Separation Membrane]

The separation membrane 12B can be produced by, for example, forming the separation functional layer 5 on the porous support member 6. Specifically, a coating liquid containing the materials of the separation functional layer 5 is prepared first. The coating liquid may contain, along with the filler, a dispersant for dispersing the filler in the coating liquid. When the coating liquid contains a silicone resin, the coating liquid may further contain a catalyst for curing the silicone resin. Next, the coating liquid is applied onto the porous support 6 to obtain a coating film. The coating film is dried to obtain the separation functional layer 5.

[Method for Producing Spiral Membrane Element]

Figure 5:
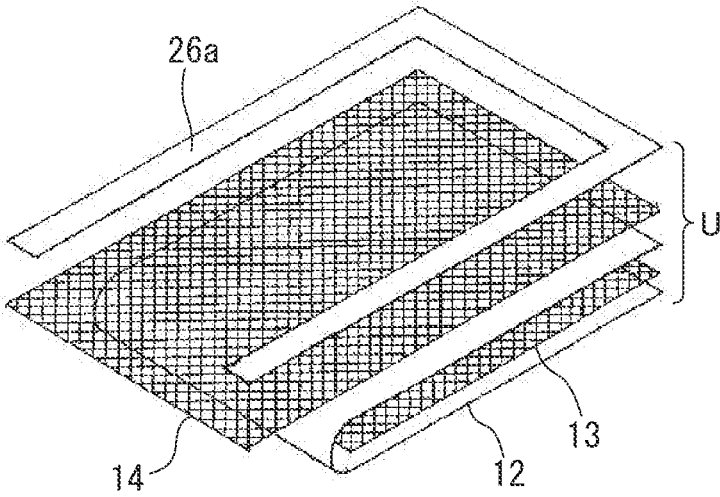
FIG. 5 is a diagram for explaining a method for producing the spiral membrane element.

Next, an example of the method for producing the separation membrane element 10 will be described referring to FIGS. 5 and 6. First, as shown in FIG. 5, the separation membrane 12 is folded in half in such a manner that the separation functional layer 1 of the separation membrane 12 is positioned inside. The supply spacer 13 is disposed inside the separation membrane 12 folded in half, and the permeation spacer 14 is disposed on the separation membrane 12. In addition, an adhesive 26a is applied onto three sides of an outer circumferential portion of the permeation spacer 14. Thus, a separation membrane unit U is obtained. The adhesive 26a is in an uncured state at this point.

Figure 6:
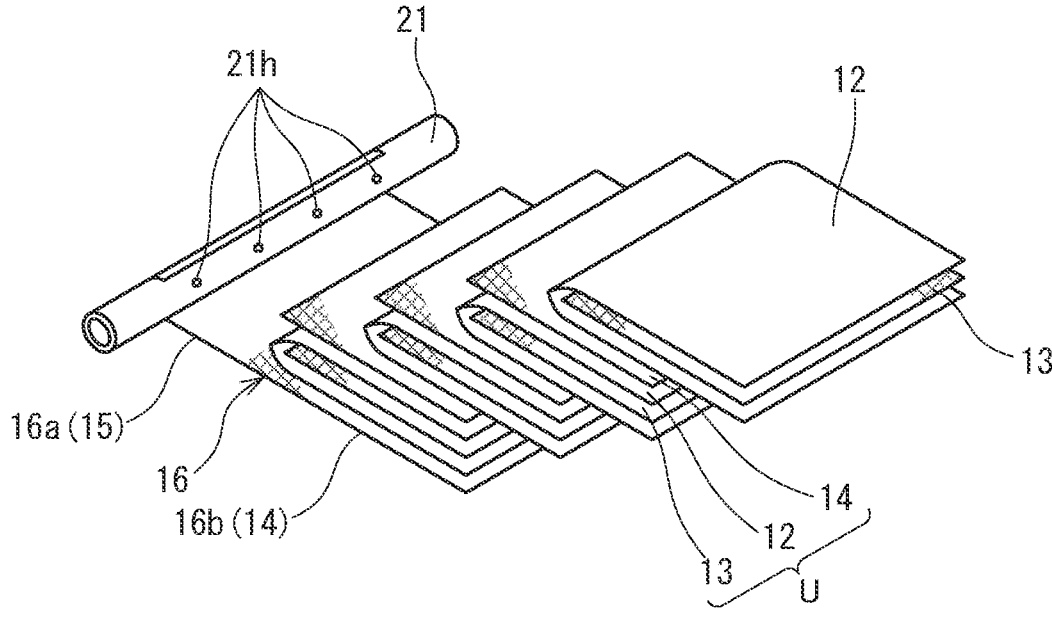
FIG. 6 is a diagram for explaining a method for producing the spiral membrane element.

Next, as shown in FIG. 6, the central tube 21, a spacer 16, and a plurality of the separation membrane units U are prepared. The spacer 16 has, for example, a first portion 16a that is directly wound around the central tube 21, and a second portion 16b that is laminated on the separation membrane unit U. The first portion 16a of the spacer 16 corresponds to the flow passage spacer 15, and the second portion 16b corresponds to the permeation spacer 14. A material, a thickness, etc. of the first portion 16a may be the same as or different from those of the second portion 16b. The plurality of separation membrane units U are placed on the second portion 16b of the spacer 16 and disposed stepwise. The number of the separation membrane units U is, for example, but not particularly limited to, 2 to 30. Note that the separation membrane unit U positioned uppermost may not have the permeation spacer 14.

Next, the first portion 16a of the spacer 16 is wound around the central tube 21. The number of windings of the first portion 16a is, for example, but not particularly limited to, 1 to 15, and preferably 2 to 10.

Next, the separation membrane units U are wound around the central tube 21. At this time, the separation membrane unit U positioned uppermost is laminated on the second portion 16b of the spacer 16. After the separation membrane units U are wound around the central tube 21, the adhesive 26a is cured to form the adhesive layer 26 while the bag-like membrane leaf 11 is formed. Thus, an assembly including the central tube 21 and the laminate 22 is obtained.

The geometry of the spacer 16 is not limited to that shown in FIG. 6. For example, the spacer 16 may further have a third portion (not shown) that is connected to the second portion 16b and extends, from the second portion 16b, on a side opposite to the central tube 21. The third portion is wound around the central tube 21 outside the laminate 22 formed by winding the separation membrane units U around the central tube 21. That is, the third portion can cover the laminate 22 outside the laminate 22. A film (Lumirror 38E20 available from PANAC Co., Ltd., for example) may be disposed between the laminate 22 and the third portion so that the supply spacer 13 of the laminate 22 is out of contact with the third portion. A material, a thickness, etc., of the third portion may be the same as or different from those of the first portion 16a.

[Properties of Spiral Membrane Element]

In the separation membrane element 10, the membrane separation of the supply fluid by the separation membrane 12 proceeds by utilizing a difference (a pressure difference) between the pressure of the supply fluid and the pressure of the permeated fluid as a driving force. Therefore, a pressure loss caused in the separation membrane element 10 reduces the above-mentioned pressure difference and decreases the permeation rate and permeation flux of the permeated fluid from the separation membrane 12. Particularly, a reduction in the pressure difference due to the pressure loss has a large impact in a method (a decompression method) according to which the separation membrane element 10 is operated by decompressing the inside of the central tube 21 because the pressure difference tends to be smaller than in a method (a pressurization method) according to which the separation membrane element 10 is operated by pressurizing the supply fluid.

According to the studies by the present inventors, the pressure loss tends to be caused particularly remarkably in the flow passage spacer 15 into which the permeated fluid from each of the membrane leaves 11 gathers. In the separation membrane element 10 of the present embodiment, the above-mentioned reduction in the pressure difference is suppressed efficiently by setting the pressure loss P1 of the flow passage spacer 15 to be lower than the pressure loss P2 of the permeation spacer 14. The separation membrane element 10 of the present embodiment makes it possible to suppress sufficiently a decrease in the permeation rate and permeation flux of the permeated fluid from the separation membrane 12 by suppressing the reduction in the pressure difference.

(Properties of Spiral Membrane Element with Respect to Carbon Dioxide)

In one example, when both the separation membrane element 10 including the separation membrane 12 (specifically the separation membrane 12A) and the separation membrane 12 (specifically the separation membrane 12A) that is in the state of a flat membrane are operated according to the pressurization method using carbon dioxide as the supply fluid, a ratio R of a permeation rate T2 (GPU) of the carbon dioxide from the separation membrane element 10 with respect to a permeation rate T (GPU) of the carbon dioxide from the separation membrane 12 that is in the state of a flat membrane is, for example, 90% or more, and preferably 95% or more. As stated herein, in the operation according to the pressurization method for determining the ratio R, the supply fluid to be supplied to the separation membrane element 10 or to the separation membrane 12 that is in the state of a flat membrane has a temperature of 23° C. and a pressure of 0.2 MPa. In the pressurization method, the pressure in a space (a space in the permeated fluid flow passage) where the permeated fluid is obtained is equal to an atmospheric pressure (101 kPa, for example) in the measurement environment. Note that GPU means $10^{-6} \cdot cm^3$ (STP)/(sec·$cm^2$·cmHg). The symbol "$cm^3$(STP)" means the volume of carbon dioxide at 1 atmospheric pressure and 0° C.

In the case of using carbon dioxide as the supply fluid, a ratio R1 of the permeation rate T2 (GPU) of the carbon dioxide from the separation membrane element 10 when the separation membrane element 10 is operated according to the pressurization method with respect to a permeation rate T1 (GPU) of the carbon dioxide from the separation membrane 12 that is in the state of a flat membrane when the separation membrane 12 that is in the state of a flat membrane is operated according to the decompression method is, for example, 85% or more, preferably 90% or more, and more preferably 95% or more. The permeation rate T1 can be measured under the conditions described later. The permeation rate T2 is the same as that mentioned above for the ratio R.

When both of the separation membrane element 10 and the separation membrane 12 that is in the state of a flat membrane is operated according to the decompression method using carbon dioxide as the supply fluid, a ratio R2 of a permeation rate T3 (GPU) of the carbon dioxide from the separation membrane element 10 with respect to the permeation rate T1 (GPU) of the carbon dioxide from the separation membrane 12 that is in the state of a flat membrane is, for example, 80% or more, and preferably 85% or more. As stated herein, in the operation according to the decompression method for determining the ratio R2, the supply fluid to be supplied to the separation membrane element 10 or to the separation membrane 12 that is in the state of a flat membrane has a temperature of 23° C. and a pressure of 0.1 MPa. In the decompression method, the space (the space in the permeated fluid flow passage) where the permeated fluid is obtained is decompressed to approximately 10 kPa or less using a vacuum pump.

(Properties of Spiral Membrane Element with Respect to Liquid Mixture Composed of IPA and Water)

In another example, when both the separation membrane element 10 including the separation membrane 12 (specifically the separation membrane 12B) and the separation membrane 12 (specifically the separation membrane 12B) that is in the state of a flat membrane are operated according to the decompression method using a liquid mixture composed of isopropanol (IPA) and water as the supply fluid, a ratio L of a permeation flux F2 (kg/m²/hr) of the IPA from the separation membrane element 10 with respect to a permeation flux F1 (kg/m²/hr) of the IPA from the separation membrane 12 that is in the state of a flat membrane is 60% or more, for example. The upper limit of the ratio L is, for example, but not particularly limited to, 90%. As stated herein, in the operation according to the decompression method for determining the ratio L, the supply fluid to be supplied to the separation membrane element 10 or to the separation membrane 12 that is in the state of a flat membrane has a temperature of 40° C. The amount of the supply fluid is set properly in a range that causes no impact on the measurement of the permeation fluxes F1 and F2. In one example, the supply flow rate of the supply fluid to be delivered to the separation membrane element 10 may be set to 40 g/min in the measurement of the permeation flux F2. A concentration of the IPA in the supply fluid is 5 wt %. In the decompression method, the space (the space in the permeated fluid flow passage) where the permeated fluid is obtained is decompressed to 1.5 kPa using a vacuum pump. In the decompression method, a gaseous permeated fluid is usually obtained. The gaseous permeated fluid is condensed and the composition of the obtained liquid permeated fluid is analyzed so that the permeation fluxes F1 and F2 can be determined.

In the separation membrane element 10 of the present embodiment, it is unnecessary to reduce the pressure loss P2 of the permeation spacer 14 to be lower than conventional pressure losses. That is, it is unnecessary, for example, to increase the thickness of the permeation spacer 14 in order to reduce the pressure loss P2. Therefore, the separation membrane element 10 of the present embodiment makes it possible to maintain the number of the membrane leaves 11 in the separation membrane element 10, thereby having an advantage that the membrane area of the separation membrane 12 can be ensured sufficiently. However, in the separation membrane element 10 of the present embodiment, the permeation spacer 14 exhibiting the pressure loss P2 that is smaller than conventional pressure losses may be used.

[Use of Separation Membrane Element]

As an example of the use of the separation membrane element 10 of the present embodiment, there can be mentioned the use for separating an acid gas from a gas mixture containing the acid gas. The acid gas in the gas mixture is, for example, carbon dioxide, hydrogen sulfide, carbonyl sulfide, sulfur oxide (SOx), hydrogen cyanide, and nitrogen oxide (NOx), and is preferably carbon dioxide. The gas mixture contains a gas other than the acid gas. The other gas is, for example, a nonpolar gas such as hydrogen or nitrogen or an inert gas such as helium, and is preferably nitrogen. The separation membrane element 10 including the separation membrane 12A mentioned above is suitably used for separating carbon dioxide from a gas mixture containing the carbon dioxide and nitrogen.

As another example of the use of the separation membrane element 10, there can be mentioned the use for separating a volatile organic compound from a liquid mixture containing the organic compound. Examples of the volatile organic compound include an alcohol, typically a lower alcohol. The lower alcohol is, for example, an alcohol having 5 or less carbon atoms. The lower alcohol may be a monohydric alcohol or a polyhydric alcohol. The lower alcohol may be linear or branched. Examples of the lower alcohol include methanol, ethanol, n-propanol, isopropanol (IPA), n-butanol, 2-butanol, isobutanol, t-butanol, and n-pentanol, and the lower alcohol is preferably IPA. The volatile organic compound may be an alcohol, such as phenol, other than the lower alcohol. The liquid mixture contains a liquid other than the volatile organic compound. The other liquid is typically water. The separation membrane element 10 including the separation membrane 12B mentioned above is suitably used for separating an alcohol from a liquid mixture containing the alcohol and water.

In the separation membrane element 10 of the present embodiment, it is preferable that at least one of (i) that the spiral membrane element is used for separating carbon dioxide from a gas mixture containing carbon dioxide and nitrogen and (ii) that the spiral membrane element is used for separating an alcohol from a liquid mixture containing an alcohol and water holds. However, the use of the separation membrane element 10 is not limited to the use of (i) or (ii) mentioned above.

<Embodiment of Membrane Separation System>

Figure 7:
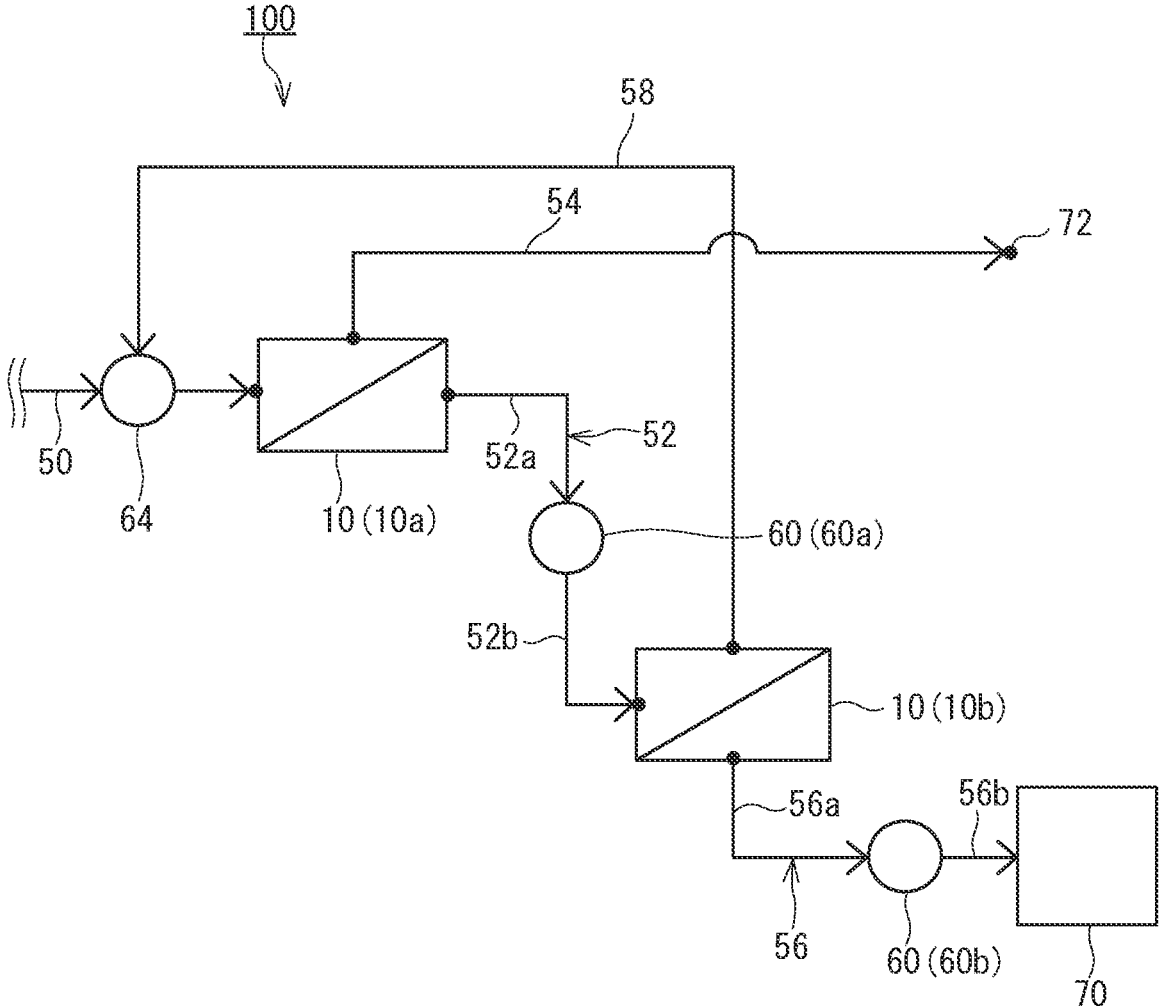
FIG. 7 is a configuration diagram of a membrane separation system including the spiral membrane element.

As shown in FIG. 7, a membrane separation system 100 of the present embodiment includes the separation membrane element 10 mentioned above and a decompression device 60. The decompression device 60 can decompress the inside of the central tube 21 of the separation membrane element 10. In other words, the decompression device 60 can cause a pressure difference or increase a pressure difference between a space in the supply fluid flow passage and a space in the permeated fluid flow passage in the separation membrane element 10. A specific example of the decompression device 60 is a vacuum device such as a vacuum pump. The membrane separation system 100 may include two separation membrane elements 10a and 10b and two decompression devices 60a and 60b. The membrane separation system 100 is suitably used for separating an acid gas from a gas mixture containing the acid gas.

The membrane separation system 100 further includes a fluid mixture supply passage 50. The fluid mixture supply passage 50 is a passage connected to a fluid mixture inlet of the separation membrane element 10a and configured to supply a fluid mixture to the separation membrane element 10a from, for example, a tank (not shown) storing the fluid mixture. The fluid mixture supply passage 50 may or may not be provided with a pressurization device 64 that pressurizes a space in a supply fluid passage of the separation membrane element 10a. Examples of the pressurization device 64 include a compressor, a blower, and a back pressure valve. The pressurization device 64 can pressurize the space in the supply fluid passage of the separation membrane element 10a by, for example, increasing the pressure of the fluid mixture to be supplied to the separation membrane element 10a.

The membrane separation system 100 further includes a permeated fluid supply passage 52. The permeated fluid supply passage 52 is a passage connected to a permeated fluid outlet of the separation membrane element 10a and a permeated fluid inlet of the separation membrane element 10b and configured to supply, from the separation membrane element 10a to the separation membrane element 10b, the permeated fluid from the separation membrane element 10a. The permeated fluid from the separation membrane element 10a is further processed in the separation membrane element 10b. The permeated fluid supply passage 52 is provided with a decompression device 60a.

The permeated fluid supply passage 52 has a first portion 52a extending from the separation membrane element 10a to the decompression device 60a and a second portion 52b extending from the decompression device 60a to the separation membrane element 10b. The decompression device 60a can decompress a space in a permeated fluid passage of the separation membrane element 10a via the first portion 52a. The decompression device 60a draws the permeated fluid having passed through the first portion 52a and discharges the permeated fluid to the second portion 52b, for example. The second portion 52b may or may not be provided with a pressurization device (not shown) that increases the pressure of the permeated fluid discharged from the decompression device 60a. This pressurization device can pressurize a space in a supply fluid passage of the separation membrane element 10b. Examples of the pressurization device include a compressor, a blower, and a back pressure valve.

The membrane separation system 100 further includes a first discharge passage 54. The first discharge passage 54 is a passage connected to a non-permeated fluid outlet of the separation membrane element 10a and configured to discharge the non-permeated fluid from the separation membrane element 10a. In the first discharge passage 54, an opening (a discharge outlet 72) for discharging the non-permeated fluid from the first discharge passage 54 is formed. The membrane separation system 100 may further include a tank (not shown) that stores the non-permeated fluid, and the first discharge passage 54 may be connected to the tank.

The membrane separation system 100 further includes a second discharge passage 56 and a tank 70. The second discharge passage 56 is a passage connected to a permeated fluid outlet of the separation membrane element 10b and an inlet of the tank 70 and configured to deliver the permeated fluid from the separation membrane element 10b to the tank 70. The tank 70 can store the permeated fluid delivered from the separation membrane element 10b. The second discharge passage 56 is provided with a second decompression device 60b.

The second discharge passage 56 has a first portion 56a extending from the separation membrane element 10b to the decompression device 60b and a second portion 56b extending from the decompression device 60b to the tank 70. The decompression device 60 can decompress a space in a permeated fluid passage of the separation membrane element 10b via the first portion 56a. The decompression device 60b draws the permeated fluid having passed through the first portion 56a and discharges the permeated fluid to the second portion 56b, for example.

The membrane separation system 100 further includes a third discharge passage 58. The third discharge passage 58 is a passage connected to a non-permeated fluid outlet of the separation membrane element 10b and configured to discharge the non-permeated fluid from the separation membrane element 10b. The third discharge passage 58 may join the fluid mixture supply passage 50. In FIG. 7, the third discharge passage 58 is connected to the pressurization device 64 and joins the fluid mixture supply passage 50 at the pressurization device 64. When the third discharge passage 58 joins the fluid mixture supply passage 50, it is possible, for example, to recycle the non-permeated fluid containing the acid gas that the separation membrane element 10b has failed to separate.

Each passage of the membrane separation system 100 is formed of, for example, a metal or resin pipe.

According to the membrane separation system 100 of the present embodiment, it is possible to decompress the space in the permeated fluid passage of the separation membrane element 10 by the decompression device 60 and carry out a separating operation. Such a separating operation according to the decompression method is more suitable for reducing the energy required to separate the fluid mixture than the pressurization method.

EXAMPLES

Hereinafter, the present invention will be described in more detail by way of Examples and Comparative Examples, but the present invention is not limited to these examples.

Example 1

[Production of Separation Membrane]

First, a coating liquid containing a silicone resin and a polyurethane resin at a weight ratio of 9:1 was prepared. The coating liquid contained water as a solvent. Next, the coating liquid was applied onto a porous support member by a gravure coating method to obtain a coating film. As the porous support member, a UF membrane (ultrafiltration membrane) RS-50 (a laminate of a PVDF porous layer and a PET nonwoven fabric) available from Nitto Denko Corporation was used. The obtained coating film was dried to form an intermediate layer. Thus, a laminate of the porous support member and the intermediate layer was produced.

Next, 2 g of polyether block amide (Pebax MH1657 available from Arkema S.A.) was put in 98 g of a 70 wt % isopropanol aqueous solution and the resultant mixture was stirred at 80° C. for 3 hours to prepare a 2 wt % Pebax solution. Next, the prepared solution was applied onto the intermediate layer by a gravure coating method. Next, the obtained coating film was dried to form a separation functional layer. Thus, a separation membrane was obtained.

[Production of Spiral Membrane Element]

A spiral membrane element of Example 1 was produced, by the method described referring to FIG. 6, using PE30 available from NBC Meshtec Inc. that serves as the spacer 16 in FIG. 6, #1000E available from KB SEIREN LTD. that serves as the permeation spacer 14, which is another permeation spacer, and further 34 mil available from TOKYO PRINTING INK MFG. CO., LTD. that serves as the supply spacer 13. The first portion 16a of the spacer 16 had a length of 90 mm in the direction in which the first portion 16a was wound around the central tube, and a length of 280 mm in the direction in which the central tube extended. The permeation spacer 14 had a length of 290 mm in the direction in which the permeation spacer 14 was wound around the central tube, and a length of 280 mm in the direction in which the central tube extended. An end of each of the spacer 16 and the permeation spacer 14 was cut off after the spacer 16 and the permeation spacer 14 were wound around the central tube. In the spiral membrane element, the length with which these spacers functioned effectively was 180 mm in the direction in which the central tube extended. The central tube 21 had an outer diameter of 17.3 mm, and the spiral membrane element had an outer diameter of approximately 2 inches.

Examples 2 and 3

Spiral membrane elements of Examples 2 and 3 were produced in the same manner as in Example 1, except that the spacer 16 was changed as shown in Table 2.

Example 4

A spiral membrane element of Example 4 was produced in the same manner as in Example 1, except that the laminate of the porous support member and the intermediate layer (the laminate before the separation functional layer was formed thereon) was used as the separation membrane.

Example 5

A spiral membrane element of Example 5 was produced in the same manner as in Example 1, except that the length of the first portion 16a of the spacer 16 and the length of the permeation spacer 14 in the direction in which the central tube extended were changed to 1 μm, the length of the permeation spacer 14 in the direction in which the permeation spacer 14 was wound around the central tube was changed to 400 μm, the length of the first portion 16a of the spacer 16 in the direction in which the first portion 16a was wound around the central tube was changed to 136 mm, and the outer diameter of the spiral membrane element was changed to approximately 4 inches.

Comparative Example 1

A spiral membrane element of Comparative Example 1 was produced in the same manner as in Example 1, except that #1000E available from KB SEIREN LTD. was used as the spacer 16.

Comparative Example 2

A spiral membrane element of Comparative Example 2 was produced in the same manner as in Example 4, except that #1000E available from KB SEIREN LTD. was used as the spacer 16.
[Evaluation on Separation Membrane in State of Flat Membrane]

The separation membrane used in the spiral membrane element of each of Examples 1 to 5 and Comparative Examples 1 and 2 was measured, in the state of a flat membrane, for the permeation rate T1 (GPU) of the carbon dioxide. The measurement of the permeation rate T1 was made by the following method using a differential pressure-type gas permeability measuring device (GTR-31AHND available from GTR TEC Corporation). First, the separation membrane that is in the state of a flat membrane was placed in a metal cell, and the metal cell was sealed with an O-ring so that no leakage would occur. The separation membrane had a membrane area of 3.14 cm². Next, a supply fluid (carbon dioxide) was injected into the metal cell in such a manner that the supply fluid was in contact with the principal surface, on the separation functional layer (or the intermediate layer) side, of the separation membrane. The supply fluid injected into the metal cell had a temperature of 23° C. and a pressure of 0.1 MPa. Next, a space adjacent to the principal surface, on the porous support member side, of the separation membrane was decompressed to approximately 10 kPa or less using a vacuum pump. Thereby, a permeated fluid was obtained from the principal surface, on the porous support member side, of the separation membrane. The permeation rate T1 of the carbon dioxide was calculated based on the composition of the obtained permeated fluid, the weight of the permeated fluid, etc. The composition, etc. of the permeated fluid were measured using gas chromatography (G2700T available from Yanako Technical Science Co., Ltd.).

The permeation rate T1 of the separation membrane used in Example 1 was 100 GPU. The permeation rate T1 of the separation membrane (the laminate of the porous support member and the intermediate layer) used in Example 4 was 1500 GPU.
[Evaluation on Spiral Membrane Element]

Next, the spiral membrane element of each of Examples 1 to 5 and Comparative Examples 1 and 2 was measured for the permeation rate T2 (GPU) of the carbon dioxide when being operated according to the pressurization method as well as for the permeation rate T3 (GPU) of the carbon dioxide when being operated according to the decompression method.

The permeation rate T2 was measured by the following method. First, a supply fluid (carbon dioxide) was supplied to the supply fluid flow passage of the spiral membrane element. The supply fluid had a temperature of 23° C. and a pressure of 0.2 MPa. Thereby, a permeated fluid was obtained via the central tube of the spiral membrane element. The permeation rate T2 of the carbon dioxide was calculated based on the flow rate, etc. of the obtained permeated fluid. The flow rate of the permeated fluid was measured using a soap film flow meter (available from HORIBA, Ltd.).

The permeation rate T3 was measured in the same manner as the permeation rate T2, except that the pressure of the supply fluid (carbon dioxide) supplied to the supply fluid flow passage was changed to 0.1 MPa and the pressure in the central tube of the spiral membrane element was decreased to approximately 10 kPa or less using a vacuum pump.

Next, the ratio R1 of the permeation rate T2 with respect to the permeation rate T1 and the ratio R2 of the permeation rate T3 with respect to the permeation rate T1 were calculated. Table 2 shows the results.

TABLE 2

| | Separation membrane | Membrane element | Permeation spacer | | | | | Flow passage |
| | Permeation rate T1 (GPU) | Outer diameter (inch) | Product number | Opening ratio (%) | Thickness (μm) | Length (mm) *1 | Pressure loss P2 (kPa) | spacer Product number |
|---|---|---|---|---|---|---|---|---|
| Example 1 | 100 | Approx. 2 | #1000E | 22 | 250 | 290 | 33.6 | PE-30 |
| Example 2 | 100 | Approx. 2 | #1000E | 22 | 250 | 290 | 33.6 | T-90 |
| Example 3 | 100 | Approx. 2 | #1000E | 22 | 250 | 290 | 33.6 | 13mil |
| Example 4 | 1500 | Approx. 2 | #1000E | 22 | 250 | 290 | 33.6 | PE-30 |
| Example 5 | 100 | Approx. 4 | #1000E | 22 | 250 | 400 | 33.6 | PE-30 |
| Comparative Example 1 | 100 | Approx. 2 | #1000E | 22 | 250 | 290 | 33.6 | #1000E |
| Comparative Example 2 | 1500 | Approx. 2 | #1000E | 22 | 250 | 290 | 33.6 | #1000E |

TABLE 2-continued

| | Flow passage spacer | | | | | Ratio |
| | Opening ratio (%) | Thickness (µm) | Length (mm) *1 | Pressure loss P1 (kPa) | Operating method | R1 (%) Ratio R2 (%) |
|---|---|---|---|---|---|---|
| Example 1 | 50 | 650 | 90 | 5.6 | Pressurization | 98.5 |
| | | | | | Decompression | 89.9 |
| Example 2 | 70 | 450 | 90 | 12.3 | Pressurization | 91.0 |
| | | | | | Decompression | 86.4 |
| Example 3 | 51 | 320 | 90 | 24.1 | Pressurization | 84.4 |
| | | | | | Decompression | 79.9 |
| Example 4 | 50 | 650 | 90 | 5.6 | Pressurization | 86.9 |
| | | | | | Decompression | 79.8 |
| Example 5 | 50 | 650 | 136 | 5.6 | Pressurization | 100 |
| | | | | | Decompression | 87 |
| Comparative Example 1 | 22 | 250 | 90 | 33.6 | Pressurization | 82.5 |
| | | | | | Decompression | 77.4 |
| Comparative Example 2 | 22 | 250 | 90 | 33.6 | Pressurization | 76.4 |
| | | | | | Decompression | 67.8 |

*1 Length in the direction in which the permeation spacer/flow passage spacer was wound around the central tube.

As understood from Table 2, the ratios R1 and R2 of the spiral membrane element of each of Examples 1 to 5 in which the pressure loss P1 of the flow passage spacer was smaller than the pressure loss P2 of the permeation spacer were respectively higher than those of the spiral membrane element of each of Comparative Examples 1 and 2. Specifically, the ratio R1 of the spiral membrane element of each of Examples 1 to 5 was 83% or more, which was higher than the ratio R1 of the spiral membrane element of each of Comparative Examples 1 and 2. Furthermore, the ratio R2 of the spiral membrane element of each of Examples 1 to 5 was 78% or more, which was higher than the ratio R2 of the spiral membrane element of each of Comparative Examples 1 and 2. The results reveal that the spiral membrane element of the present embodiment is suitable for suppressing a decrease in the permeation rate of the permeated fluid from the separation membrane.

Example 6

[Production of Separation Membrane]

First, a coating liquid was prepared by mixing a silicone resin (YSR3022 available from Momentive Performance Materials Japan LLC.), a silicone curing catalyst (YC6831 available from Momentive Performance Materials Japan LLC.), and a high-silica zeolite (HiSiv 3000 available from UNION SHOWA K.K.). Next, the coating liquid was applied onto a porous support (RS-50 available from Nitto Denko Corporation) to obtain a coating film. The coating film was dried to produce a separation functional layer. Thus, a separation membrane was obtained. The weight ratio between the silicone resin and the high-silica zeolite was 50:50 in the separation functional layer.

[Production of Spiral Membrane Element]

A spiral membrane element of Example 6 was produced, by the method described referring to FIG. 6, using PE30 available from NBC Meshtec Inc. that serves as the spacer 16 in FIG. 6, #1000E available from KB SEIREN LTD. that serves as the permeation spacer 14, which is another permeation spacer, and further 34 mil available from TOKYO PRINTING INK MFG. CO., LTD. that serves as the supply spacer 13. The first portion 16a of the spacer 16 had a length of 90 mm in the direction in which the first portion 16a was wound around the central tube, and a length of 280 mm in the direction in which the central tube extended. The permeation spacer 14 had a length of 140 mm in the direction in which the permeation spacer 14 was wound around the central tube, and a length of 280 mm in the direction in which the central tube extended. An end of each of the spacer 16 and permeation spacer 14 was cut off after the spacer 16 and permeation spacer 14 were wound around the central tube. In the spiral membrane element, the length with which these spacers functioned effectively was 180 mm in the direction in which the central tube extended. The central tube 21 had an outer diameter of 17.3 mm, and the spiral membrane element had an outer diameter of approximately 2 inches.

Example 7

A spiral membrane element of Example 7 was produced in the same manner as in Example 6, except that the spacer 16 was changed as shown in Table 3.

Comparative Example 3

A spiral membrane element of Comparative Example 3 was produced in the same manner as in Example 6, except that #1000E available from KB SEIREN LTD. was used as the spacer 16.

[Evaluation on Separation Membrane in State of Flat Membrane]

The separation membrane used in the spiral membrane element of each of Examples 6 and 7 and Comparative Example 3 was measured, in the state of a flat membrane, for the permeation flux F1 of isopropanol (IPA) (kg/m²/hr). The measurement of the permeation flux F1 was made by the following method. First, the separation membrane that is in the state of a flat membrane was placed in a metal cell, and the metal cell was sealed with an O-ring so that no leakage would occur. The separation membrane had a membrane area of 34.2 cm². Next, a supply fluid was charged into the metal cell in such a manner that the supply fluid was in contact with the principal surface, on the separation functional layer side, of the separation membrane. The supply fluid was composed substantially of IPA and water. The concentration of the IPA in the supply fluid was 5 wt %. The supply fluid supplied into the metal cell had a temperature of 40° C. Next, a space adjacent to the principal surface, on the porous support member side, of the separation membrane was decompressed to 1.5 kPa using a vacuum pump. Thereby, a gaseous permeated fluid was obtained from the principal surface, on the porous support member side, of the separation membrane. That is, the operation according to the decompression method allowed separation by a pervaporation method (PV) to proceed. The gaseous permeated fluid was cooled using −196° C. liquid nitrogen to liquefy the permeated fluid. The composition of the liquid permeated fluid was analyzed by gas chromatography. The permeation flux F1 of the IPA was calculated based on the composition of the obtained permeated fluid, the weight of the permeated fluid, etc.

[Evaluation on Spiral Membrane Element]

Next, the spiral membrane element of each of Examples 6 and 7 and Comparative Example 3 was measured for the permeation flux F2 of the IPA (kg/m²/hr) when being operated according to the decompression method.

The permeation flux F2 was measured by the following method. First, a supply fluid was supplied to the supply fluid flow passage of the spiral membrane element. The supply fluid was composed substantially of IPA and water. The concentration of the IPA in the supply fluid was 5 wt %. The supply fluid had a temperature of 40° C. The supply flow rate of the supply fluid was 40 g/min. Next, the pressure in the central tube of the spiral membrane element was decreased to 1.5 kPa using a vacuum pump. Thereby, a gaseous permeated fluid was obtained via the central tube of the spiral membrane element. That is, the operation according to the decompression method allowed separation by a pervaporation method (PV) to proceed. The gaseous permeated fluid was cooled using −196° C. liquid nitrogen to liquefy the permeated fluid. The composition of the liquid permeated fluid was analyzed by gas chromatography. The permeation flux F2 of the IPA was calculated based on the composition of the obtained permeated fluid, the weight of the permeated fluid, etc.

Next, the ratio L of the permeation flux F2 with respect to the permeation flux F1 was calculated. Table 3 shows the results.

INDUSTRIAL APPLICABILITY

The spiral membrane element of the present embodiment is suitable for separating an acid gas from a gas mixture containing the acid gas. In particular, the spiral membrane element of the present embodiment is suitable for separating carbon dioxide from an off-gas of a chemical plant or a thermal power plant. The spiral membrane element of the present embodiment is also suitably used for separating a volatile organic compound from a liquid mixture containing the organic compound.

The invention claimed is:

1. A spiral membrane element comprising:
a central tube;
a membrane leaf that has a separation membrane and a permeation spacer and is wound around the central tube; and
a flow passage spacer that is connected to the permeation spacer and is wound around the central tube on a side closer to the central tube than the membrane leaf is,
wherein a pressure loss P1 of the flow passage spacer measured by a test below is smaller than a pressure loss P2 of the permeation spacer measured by the test below;
Test: A specimen is prepared by laminating, on a polyethylene terephthalate film, a spacer (the flow passage spacer or the permeation spacer) that is rectangular and is 150 mm in length and 47 mm in width; A nitrogen gas is delivered to a space adjacent to the polyethylene terephthalate film of the specimen in such a manner that a pressure in the space is 0.1 MPa while a nitrogen gas is delivered to the spacer at a flow rate of 2.5 L/min; A pressure loss caused by that the nitrogen gas moves in the spacer in a longitudinal direction of the spacer is measured.

2. The spiral membrane element according to claim 1, wherein the pressure loss P1 is 30 kPa or less.

TABLE 3

| Membrane | | Permeation spacer | | | | | Flow passage spacer | | | | | | |
| --- | --- | --- | --- | --- | --- | --- | --- | --- | --- | --- | --- | --- | --- |
| element Outer diameter (inch) | Product number | Open-ing ratio (%) | Thick-ness (μm) | Length (mm) *1 | Pres-sure loss P2 (kPa) | | Product number | Open-ing ratio (%) | Thick-ness (μm) | Length (mm) *1 | Pres-sure loss P1 (kPa) | Operating method | Ratio L (%) |
| Example 6 | Approx. 2 | #1000E | 22 | 250 | 140 | 33.6 | PE-30 | 50 | 650 | 90 | 5.6 | PV | 63.2 |
| Example 7 | Approx. 2 | #1000E | 22 | 250 | 140 | 33.6 | PE-14 | 54 | 1350 | 90 | 1.0 | PV | 62.7 |
| Comparative Example 3 | Approx. 2 | #1000E | 22 | 250 | 140 | 33.6 | #1000E | 22 | 250 | 90 | 33.6 | PV | 59.6 |

*1 Length in the direction in which the permeation spacer/flow passage spacer was wound around the central tube.

As understood from Table 3, the ratio L of the spiral membrane element of each of Examples 6 and 7 in which the pressure loss P1 of the flow passage spacer was smaller than the pressure loss P2 of the permeation spacer was higher than that of the spiral membrane element of Comparative Example 3. Specifically, the ratio L of the spiral membrane element of each of Examples 6 and 7 was approximately 63%, which was higher than the ratio L of the spiral membrane element of Comparative Example 3. The results reveal that the spiral membrane element of the present embodiment is suitable for suppressing a decrease in the permeation flux of the permeated fluid from the separation membrane even when a liquid is used as the supply fluid.

3. The spiral membrane element according to claim 1, wherein the flow passage spacer has an opening ratio of 30% or more.

4. The spiral membrane element according to claim 1, wherein the flow passage spacer has a thickness of 300 μm or more.

5. The spiral membrane element according to claim 1, wherein the membrane leaf has two pieces of separation membranes, and the two pieces of the separation membranes are stacked with each other and sealed in such a manner as to have a bag-like structure.

6. The spiral membrane element according to claim 5, wherein the permeation spacer is disposed between the two pieces of the separation membranes.

7. The spiral membrane element according to claim 1, further comprising a supply spacer laminated on the membrane leaf.

8. The spiral membrane element according to claim 1, wherein the central tube is provided with an opening and the flow passage spacer is in contact with the opening.

9. The spiral membrane element according to claim 1, wherein the separation membrane has:

a separation functional layer; and a porous support member supporting the separation functional layer.

10. The spiral membrane element according to claim 9, wherein the separation functional layer includes a polyether block amide resin.

11. The spiral membrane element according to claim 9, wherein the separation functional layer includes a silicone resin.

12. The spiral membrane element according to claim 1, wherein at least one of (i) that the spiral membrane element is used for separating carbon dioxide from a gas mixture containing carbon dioxide and nitrogen and (ii) that the spiral membrane element is used for separating an alcohol from a liquid mixture containing an alcohol and water holds.

13. A membrane separation system comprising:

the spiral membrane element according to claim 1; and a decompression device that decompresses an inside of the central tube.

14. A spiral membrane element comprising:

a central tube;

a membrane leaf that has a separation membrane and a permeation spacer and is wound around the central tube; and a flow passage spacer that is connected to the permeation spacer and is wound around the central tube on a side closer to the central tube than the membrane leaf is, wherein a pressure loss P1 of the flow passage spacer measured by a test below is 30 kPa or less;

Test: A specimen is prepared by laminating, on a polyethylene terephthalate film, the flow passage spacer that is rectangular and is 150 mm in length and 47 mm in width; A nitrogen gas is delivered to a space adjacent to the polyethylene terephthalate film of the specimen in such a manner that a pressure in the space is 0.1 MPa while a nitrogen gas is delivered to the flow passage spacer at a flow rate of 2.5 L/min; A pressure loss caused by that the nitrogen gas moves in the flow passage spacer in a longitudinal direction of the flow passage spacer is measured.

\*  \*  \*  \*  \*